United States Patent Office 2,740,767
Patented Apr. 3, 1956

2,740,767

MODIFICATION OF COUMARONE-INDENE RESINS WITH FORMALDEHYDE

Frederick W. Breuer and Burt F. Hofferth, Manheim Township, Lancaster County, Pa., assignors to Armstrong Cork Company, Lancaster, Pa., a corporation of Pennsylvania No Drawing. Application February 20, 1953, Serial No. 338,127

5 Claims. (Cl. 260—67)

This invention relates to modification of coumarone-indene resins. More particularly, the invention relates to the process of converting soft coumarone-indene resins of low cloud point to high cloud point, hard resins which are particularly suited for use in the manufacture of products requiring the presence of hard resins as a component.

Coumarone-indene resins have been known and used for a number of years. These resins are generally produced by polymerizing coal tar naphthas. These fractions contain resin-forming material, such as styrene, dicyclopentadiene, methyl coumarone, methyl indene, and indene. Because of the difficulty of separating these materials, commercially available resins are generally produced by subjecting fractions rich in coumarone and indene to polymerization conditions. Generally speaking, these materials are polymerized by treatment with acid catalysts such as sulfuric acid to obtain the resinous product. The polymerization normally proceeds quite rapidly and the reaction is generally cooled to prevent darkening of the resin by high temperatures. When the polymerization is complete, the acid is separated from the resin solution. In order to obtain high melting point resins, the solvent must be largely removed and often dimers, which are oily in character, must also be removed. Because of the nature of the process of producing these resins and the raw materials from which they are produced on a commercial scale, the softening point, molecular weight, and cloud point vary considerably. Generally speaking, the more expensive resins are those having high softening points and high cloud points.

As disclosed in Powers Patent No. 2,529,260, the cloud point of a resin in a reference mineral oil is a highly important characteristic of the resin when it is to be employed in the manufacture of floor tile. In order to produce a tile which is resistant to indentation and which is characterized by resistance to alkali, the binder of the tile should comprise a resin-plasticizer system such that the system possesses limited incompatibility, as shown by a cloudlike separation of resin and oil in the binder at temperatures between about 20° C. and 70° C., and advantageously between about 35° C. and 55° C. To indicate whether a resin such as a coumarone-indene resin may be suitable for the manufacture of floor tile, a cloud point determination may be made by heating amounts of oil and resin until they are in solution and placing the mixture in a test tube in a water bath or glycerine bath. The bath is well stirred and allowed to cool slowly and the temperature at which the mixture becomes opaque is noted. This is the cloud point of the resin in the reference oil.

In some instances, the cloud point of certain dark-colored commercial resins is difficult to determine. In such cases, a mixed cloud point may be determined by an indirect method as follows:

4 parts of light-colored resin of known cloud point in a particular mineral oil are mixed with 1 part of the dark-colored resin and this is blended with the amount of the particular mineral oil. The cloud point of this mixture is determined as described above. From this determination, the cloud point of the dark-colored resin can be found following the formula $CP = L + 5(O - L)$ where:

$CP$ = cloud point of dark-colored resin
$L$ = cloud point of light-colored resin
$O$ = cloud point of mixture of 4 parts of light-colored resin and 1 part of dark-colored resin We have found that soft, low cloud point, less valuable coumarone-indene resin may be converted to hard, high cloud point, more valuable resin suitable for wide application including use as an ingredient of floor tile by a process which includes heating the soft, low cloud point resins in the presence of a formaldehyde-yielding substance and an acid catalyst, whereby the softening points and cloud points of the less valuable resins are increased to ranges such as those which are useful in the production of floor tile.

In accordance with our invention, coumarone-indene resins may be heated in the presence of an acid catalyst and a formaldehyde-yielding material to increase the softening point and to increase the cloud point of the resinous material. While any coumarone-indene resin may be upgraded in accordance with our invention, our invention is particularly adapted to increasing the softening point and the cloud point of coumarone-indene resins having low softening points such, for example, as ring and ball softening points below about 18° C. and low cloud points such, for example, as mixed cloud points below 0° C.

The acid catalyst employed in the practice of our invention may be any acid catalyst known to the art. Typical of such catalysts are sulfuric acid, polyphosphoric acid, and the like. We consider Friedel-Crafts catalysts, such as aluminum chloride, stannic chloride, boron trifluoride, and complexes of these catalysts, such as boron trifluoride etherate, to be the equivalent of sulfuric acid for the purposes of our invention.

The formaldehyde-yielding material may be any material well known to the art as yielding formaldehyde in concondensation reactions. For example, formaldehyde, paraformaldehyde, methylal, dioxolane, alpha trioxymethylene, and the like may be employed in the upgrading of coumarone-indene resins in accordance with our invention.

While the quantity of catalysts employed in the process of our invention may vary, depending, among other things, upon the nature of the starting material, the qualities desired in the final product, the conditions under which the reaction occurs, and the like, generally speaking, we employ catalytic amounts of catalysts up to about 35% by weight of the coumarone-indene resin.

The quantity of formaldehyde-yielding material employed to upgrade resins in accordance with our invention may vary, depending, among other things, upon the nature of the resin to be treated, the desired properties of the end product, and the molecular weight of the catalyst. Generally speaking, we have produced valuable resins having high cloud points and high softening points when the formaldehyde-yielding substance is present in amounts such as about 5% to about 50% by weight of the coumarone-indene resin, and advantageously about 10% to about 30% by weight of the resin.

The time during which the reactants are held under process may vary, depending upon the starting material, the temperatures employed, and the like. Generally speaking, the reaction time varies from about 10 minutes up to a time insufficiently long to result in the formation of a gel. The reaction time is readily determined by the skill of the operator and is maintained below the time required for gel formation. The temperature of the reaction is advantageously from room temperature up to the boiling point of the mixture under process.

In a particularly advantageous embodiment of our invention, the reaction is conducted in the presence of alkyl esters of aliphatic acids, such as ethyl acetate, butyl acetate, and the like. These esters are employed to render the various reactants compatible and thereby more uniformly dispersible through the reaction mass.

Our invention may be more fully understood by reference to the following specific examples:

Example I

To 60 g. of coumarone-indene resin having a ring and ball softening point of 5° C. to 15° C. was added a mixture of 15 g. of paraformaldehyde, 12.5 ml. of concentrated sulfuric acid, and 62.5 ml. of ethyl acetate. The reaction temperature was 50–60° C. for one hour. The catalyst was neutralized with a solution of sodium hydroxide and after superheated steam distillation at 208° C. at 38 mm., the yield of hard, brittle resin was 58.6 g. (97.8%). The properties of the resin were as follows: softening point, 155°; mixed cloud point, 163°; and viscosity, 10 minutes, 40 seconds.

Example II

To 60 g. of coumarone-indene resin having a ring and ball softening point of 5° C. to 15° C. was added a mixture of 7.5 g. of paraformaldehyde, 12.5 ml. of concentrated sulfuric acid, and 62.5 ml. of ethyl acetate. The reaction temperature was 50–60° C. for one-half hour. The catalyst was neutralized with a solution of 30 g. of sodium hydroxide. The resin solution was dried and the solvent was removed by superheated steam distillation at 200° C. at 35 mm. The yield of hard, brittle resin was 49.8 g. (83%). The resin had the following physical properties: softening point, 136°; mixed cloud point, 143°; and viscosity, Z–4 to Z–5.

Example III

To 150 ml. (156.3 g.) of coumarone-indene dimer oil was added a mixture of 30 g. of paraformaldehyde, 25 ml. of concentrated sulfuric acid, and 125 ml. of ethyl acetate. The reaction temperature was 50–60° C. for one hour during which time the mixture was vigorously agitated. A solution containing 50 g. of sodium hydroxide was used to remove the catalyst. After the resin solution had been separated with the addition of benzene as an aid, the organic layer was dried over anhydrous sodium sulfate. The solvent and unreacted material were removed by a vacuum distillation with superheated steam at 205° C./27 mm. The hard, brittle residue weighed 106.6 g. (68.2%) based on the dimer oil. The physical properties of the resin were: softening point, 135°; mixed cloud point, 130.5°; and viscosity, Z–3.

The materials may be subjected to hydrogenation before or after condensation to improve the stability of the final products. We prefer to hydrogenate prior to condensation. The more reactive unsaturation may be selectively hydrogenated by means known to the art as in the presence of Raney nickel catalyst.

The above comparison indicates a substantial increase in softening points and a substantial increase in the mixed cloud point of starting resins by following the practice of our invention.

By means of our invention, we have provided a method of upgrading coumarone-indene resins to materials having high mixed cloud points and high softening points. Our invention is particularly adaptable to the conversion or upgrading of low molecular weight coumarone-indene resins having low cloud points to useful products. The resins may be used in a variety of applications where a harder material having a higher cloud point than the original resin is required.

We claim:

1. A process of upgrading coumarone-indene resin having a ring and ball softening point below about 18° C. and a mixed cloud point below 0° C. comprising heating said resin in the presence of a formaldehyde-yielding substance of the group consisting of formaldehyde, paraformaldehyde, methylal, dioxolane, and alpha trioxymethylene and an acid catalyst.

2. The product of the process of claim 1.

3. A process of producing hard, high cloud point resins from coumarone-indene resins having a ring and ball softening point below about 18° C. and a mixed cloud point below 0° C. comprising heating said resin in the presence of a formaldehyde-yielding substance of the group consisting of formaldehyde, paraformaldehyde, methylal, dioxolane, and alpha trioxymethylene and an acid catalyst and stripping the resulting mixture with superheated steam.

4. A method of producing hard, high cloud point resins from coumarone-indene resins having a ring and ball softening point below about 18° C. and a mixed cloud point below 0° C., which comprises heating said coumarone-indene resin at a temperature of about room temperature to boiling in the presence of a formaldehyde-yielding substance of the group consisting of formaldehyde, paraformaldehyde, methylal, dioxolane, and alpha trioxymethylene and an acid catalyst and stripping the resulting mixture to recover hard, high cloud point resinous material therefrom.

5. A method of producing hard, high cloud point resins from coumarone-indene resins having a ring and ball softening point below about 18° C. and a mixed cloud point below 0° C., which comprises heating said resin in the presence of formaldehyde at a temperature from about room temperature to the boiling point of the reaction mass, stopping the reaction prior to gel formation, and stripping the resulting mass to recover hard, high cloud point coumarone-indene resins therefrom.

References Cited in the file of this patent

UNITED STATES PATENTS

| Number | Name | Date |
|---|---|---|
| 1,800,295 | Honel | Apr. 14, 1931 |
| 2,053,850 | Sturken | Sept. 8, 1936 |
| 2,382,184 | Thompson | Aug. 14, 1945 |
| 2,384,107 | Lieber | Sept. 4, 1945 |
| 2,408,782 | Kientz | Oct. 8, 1946 |